United States Patent [19]

West

[11] Patent Number: 4,516,001

[45] Date of Patent: May 7, 1985

[54] AUTOMOBILE HORN CIRCUIT AND REPLACEMENT PART THEREFOR

[76] Inventor: Frank M. West, 113 Weston Pl., Eatontown, N.J. 07724

[21] Appl. No.: 498,308

[22] Filed: May 26, 1983

[51] Int. Cl.³ .................. H01H 9/00; H01R 39/00
[52] U.S. Cl. .................... 200/61.54; 200/61.56; 200/281; 339/3 S
[58] Field of Search ............ 200/61.54–61.57, 200/237, 238, 239–251, 275, 280, 281; 339/3 R, 3 S, 10, 31, 75 R, 76, 77, 244 R, 244 UC, 247, 253 R, 255 R, 258 R, 258 RR, 258 TC, 262 R, 262 RR, 264 R, 267

[56] References Cited

U.S. PATENT DOCUMENTS

| | | | |
|---|---|---|---|
| Re. 15,991 | 2/1925 | Lundberg | 200/281 |
| 1,612,064 | 12/1926 | Sedgwick | 200/281 |
| 1,629,497 | 5/1927 | Fraser | 200/61.54 |
| 2,894,090 | 7/1959 | Timoff et al. | 200/61.56 |
| 4,063,789 | 12/1977 | Kreisl | 200/61.56 X |
| 4,157,854 | 6/1979 | Beauch | 200/61.56 X |

*Primary Examiner*—J. R. Scott
*Attorney, Agent, or Firm*—Gordon W. Kerr

[57] ABSTRACT

A replacement electrical brush for an auto horn circuit in which a metal rod has an enlarged head which rides on a slip ring on the underside of the auto's steering wheel. When the original brush head comprising the enlarged head becomes worn and inoperative the replacement brush head of the present invention is slipped over the worn brush head to provide a replacement. The replacement brush head can be a simple metal cap. The invention eliminates the necessity of removing and replacing the entire metal rod.

7 Claims, 7 Drawing Figures

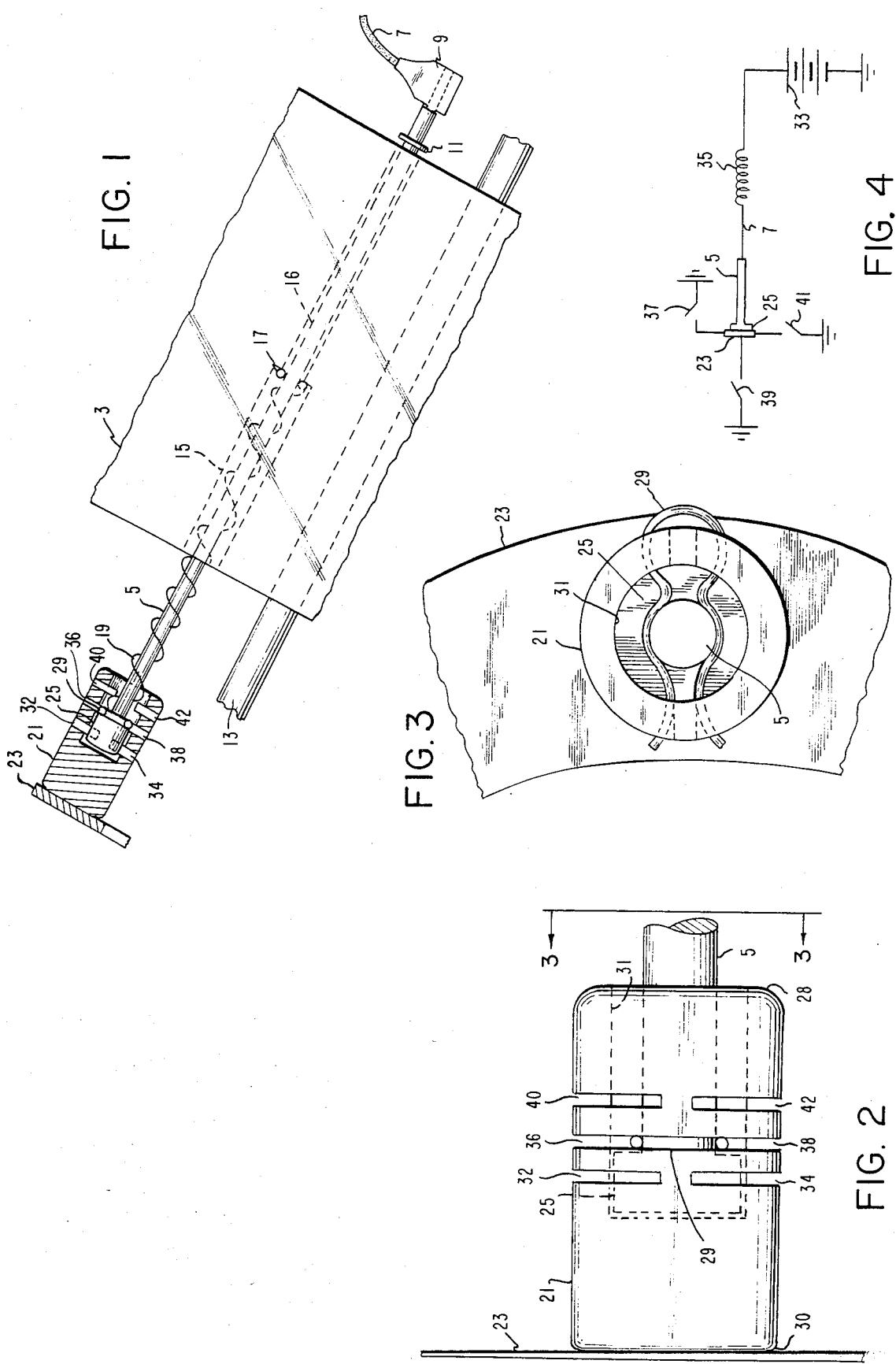

AUTOMOBILE HORN CIRCUIT AND REPLACEMENT PART THEREFOR

BACKGROUND OF THE INVENTION

This invention relates to the electrical circuit for the operation of automobile horns, and more particularly to a particular type of metallic brush utilized in certain imported and domestic vehicles to provide an electrical connection between the operating coil of the horn or horn relay which is normally somewhere under the hood of the vehicle, and the horn button or switch which is on the steering wheel. Normally the horn or horn relay coil has one of its terminals permanently connected to the plus or non-grounded terminal of the vehicle's battery and the other terminal is connected to a horn wire which runs up the steering column to the horn switch or button. When operated, the horn switch grounds this wire usually through the metallic steering shaft and wheel to complete the circuit to the horn. An electrical brush and slip ring is required to complete the electrical circuit to the rotary steering wheel. The auto horn circuit to which the present invention is applicable comprises a slip ring on the underside of the steering wheel which engages the upper end of an elongated metal rod which is mounted in an insulated control yoke which surrounds the steering shaft just under the steering wheel and which supports other control devices such as the vehicle's directional signals, windshield wiper and washers, etc. The elongated rod is mounted in a hole in an insulated portion of the control yoke and is spring loaded so that the enlarged upper portion thereof forms an electrical brush which rides on the slip ring. The horn wire is attached to the other or lower end of the metal rod.

In normal use the constant turning of the steering wheel causes the electrical brush to wear down and eventually the head wear is such that electrical contact can no longer be made and the horn becomes inoperative. Prior to the present invention, in order to repair this defect it was necessary to replace the entire metal rod. This was a time consuming and hence costly job which required removal of the steering wheel and the aforementioned control yoke, since it was necessary to disconnect the horn wire from the lower or tail end of the rod which is on the underside of the control yoke, before the old rod could be removed.

SUMMARY OF THE INVENTION

In accordance with the invention, the repair of such a defect is accomplished by attaching a new and enlarged head to the worn electrical brush so that the overall length to the rod is at least as much as was the original rod when new. The replacement electrical brush head or cap may comprise merely a cylindrical metal piece with a bore slightly larger than the diameter of the worn brush head and with the depth of said bore somewhat more than the length of the worn brush head. This replacement brush is simply slipped over the worn one and can be snapped in place by means of one or more spring clips.

The sides of the replacement brush head near the lower end or bore thereof can have a plurality of pairs of slots therein, with the pairs of slots at opposite sides of the cylindrical walls and with the slots communicating with the bore of the cylindrical metal cap. The pairs of slots are designed to accommodate spring clips which hold the replaced brush head securely on the end of the metal rod to form a new brush head.

Other types of replacement brush heads are possible, for example a simple cylindrical cap with a cylindrical bore therein which is slipped over the worn brush head and is held thereon by the pressure of the aforementioned spring-loaded rod. Also a one-piece self retaining replacement brush head can be used which snaps over the worn brush head.

It is thus an object of this invention to provide a replacement for an electrical brush head which has become worn through use, and which replacement brush head can be easily installed.

Another object of the invention is to provide a replacement for a metallic electrical brush head which forms one end of a metal rod which contacts a slip ring mounted on the underside of a steering wheel and which rod is mounted and supported by an insulated portion of a control yoke which surrounds the steering wheel beneath the steering wheel and wherein it is necessary to remove the steering wheel and the control yoke to replace said metal rod.

A still further object of the invention is to simplify the repair of horn circuits of automobiles by fitting a new brush head or cap over a worn brush head, so that the repaired brush head will make good electrical contact with its mating slip ring.

Another object of the invention is to provide a simple and inexpensive replacement brush head for auto horn circuits which can be quickly and easily slipped over and clipped onto a worn brush head.

A further object of the invention is to provide a metal cap which can be slipped over a worn metallic electrical brush head to form an extension thereof which is capable of making electrical contact with a mating slip ring.

These and other objects and advantages of the invention will become apparent from the following detailed description and the drawings.

BRIEF DESCRIPTION OF THE DRAWINGS

FIG. 1 shows a side view, partially in section, of a portion of an automobile horn circuit with the replacement electrical brush applied thereto.

FIGS. 2 and 3 show side and end views respectively of a replacement brush head of the present invention installed over a worn brush head.

FIG. 4 is a diagram of a horn circuit to which the present invention is applicable.

DETAILED DESCRIPTION OF A PREFERRED EMBODIMENT

Figure 7:
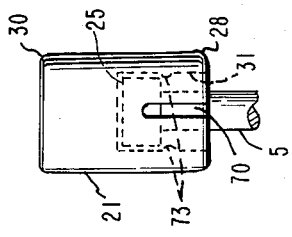
FIG. 7 shows another type of replacement brush head.

The side view of FIG. 1 shows a portion of the steering column assembly of an auto just below the steering wheel and illustrates the steering shaft 13 as it passes through the aforementioned control yoke 3. The yoke 3 normally comprises a plastic chassis or frame with electromechanical controls such as directional signals and the like, not shown in FIG. 1, mounted thereon. Passing through and supported by the plastic yoke 3 is an elongated metal rod 5 which has the horn wire 7 attached to its lower end by means of terminal 9 which slips over the end of the rod 5. The rod passes through a bore in the yoke 5 having two different diameters, the lower portion of this bore, 16, is just large enough in diameter to accommodate the rod 5 and the upper portion of the bore, 15, is larger to accommodate the rod with the coil spring 19 thereon. The junction of these bores forms a shoulder 17 against which the lower end of coil spring 19 abuts. The upper end of rod 5 has an integral enlarged portion or head 25 which forms an electrical brush which, in the absence of the present invention, bears against the slip ring 23, which is mounted on the underside of the steering wheel. The upper end of coil spring 19 abuts against the shoulder formed by the rear of the brush head 25 to urge the rod and brush head against the slip ring. A snap fastener 11 which seats in a circular groove, not shown, in the rod just above the lower end thereof limits the upward travel of the rod.

It is assumed that the original brush head 25 of FIG. 1 has suffered wear to the extent that it can no longer make effective contact with slip ring 23. In accordance with the invention, a replacement brush head or cap 21, shown in cross section through the diameter thereof, has been slipped over the worn brush head 25, and clipped in place by means of spring clip 29. As can be seen, this replacement brush head effectively extends the length of rod 5 and worn brush head 25 and additionally provides a new contact surface to replace the original surface of head 25 which may have become pitted from repeated sounding of the horn. Also the extended brush head compresses the spring 19 to provide additional pressure so that positive and low resistance contact can be made with the slip ring. Further, the area of the replacement brush head 21 which bears on slip ring 23 is larger than that of the original brush head 25. This further contributes to the making of good electrical contact.

The larger scale drawings of FIGS. 2 and 3 show details of the replacement brush head 21 and how it is secured. The side view of FIG. 2 shows a brush head 21 which has a cylindrical bore 31 large enough to accommodate the original brush head 25 of rod 5. The brush head 21 is preferably cylindrical in shape with rounded edges 28 and 30 at either end thereof. The radius of rounded edge 28 is larger than that of edge 30, as illustrated. The rounding of the lower edge 28 is useful in preventing this part from getting caught on or engaging some other part of the steering column assembly. This might be likely to occur if the original rod 5 becomes bent. The rounding 30 of the upper edge prevents the top of the replacement brush 21 from digging into the slip ring and causing wear thereof. The bore 31 of the illustrative brush head 21 extends slightly more than halfway into the metal cap or head 21. A plurality of pairs of slots are cut in the side walls of the hollow portion of the cylinder 21. Three pairs of slots are illustrated in FIG. 2. They are 32 and 34, 36 and 38 and 40 and 42, each slot of a pair being diametrically opposite from the other. The slots are made deep enough so that the spacing between the troughs of each pair of slots is less than the diameter of the rod 5 below the enlarged head 25 thereof, as shown in FIG. 3. These slots are adapted to receive a spring clip such as clip 29 of FIG. 3 which can easily be inserted through one of the pairs of slots to snap over the rod 5 just below the worn brush head 25 to retain the replacement brush head 21. A number of these pairs of slots are provided to accommodate different degrees of wear of the original brush head 25. Also more than one clip can be used for added security. For example, in FIG. 2 the clip 29 is shown in the middle pair of slots, 36 and 38, however a second clip could also have been inserted in the slots 40-42. The aforementioned spacing of the troughs of each pair of slots insures that the spring clip 29 can close properly around rod 5.

The distance from the base of the bore 31 to the top of the replacement brush 21 which contacts the slip ring 23 is the extension in length of the worn brush head 25. It has been found that this distance should be in the range of 5 to 10 millimeters for best functioning of the invention.

Figure 5:
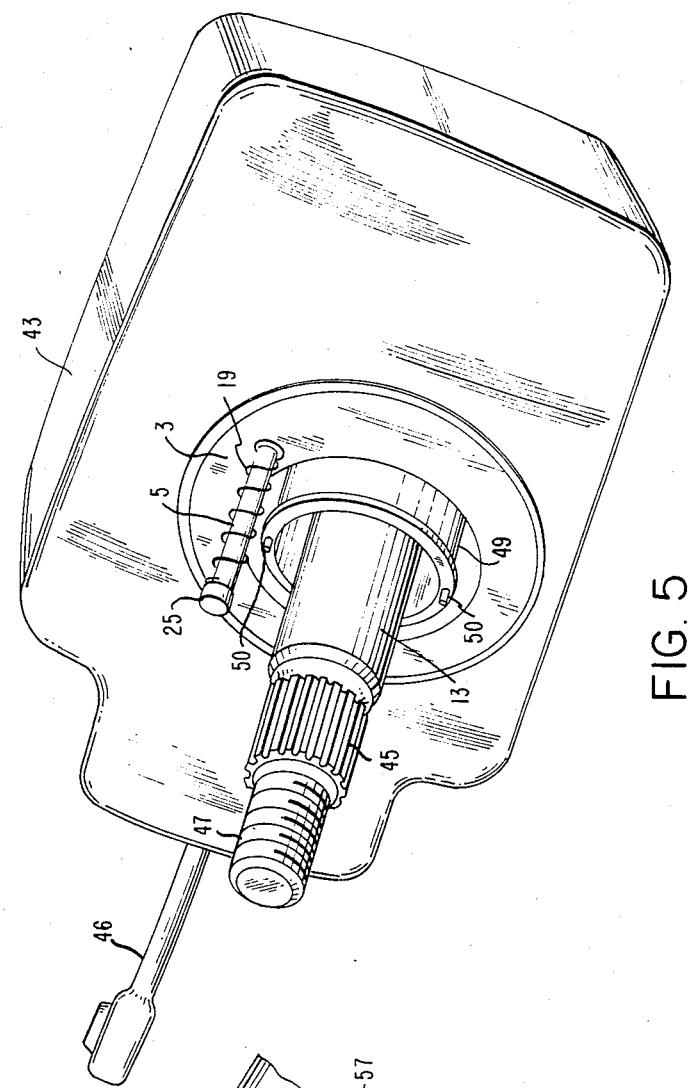
FIG. 5 is a pictorial view of the steering shaft of an automobile with the steering wheel removed and showing a worn electrical brush head.

FIG. 5 is a pictorial view of the upper portion of the steering column of an automobile to which the invention is applicable, showing the upper end of the steering shaft 13 with splines 45 which engage mating splines in the steering wheel hub and threaded portion 47 to which the steering wheel retaining nut is applied. Surrounding the steering column is the control yoke 3 with its housing 43. Projecting from the left side of the housing 43 is direction signal operating lever 46, which also may control the headlights. The sleeve 49 around the steering shaft has a pair of studs therein which engage mating holes 60 on the underside of the steering wheel, shown in FIG. 6. The sleeve 49 is part of the self cancelling feature of the directional signal mechanism. The rod 5 with its worn electrical brush head 25 and spring 19 is shown projecting out of the control yoke assembly.

Figure 6:
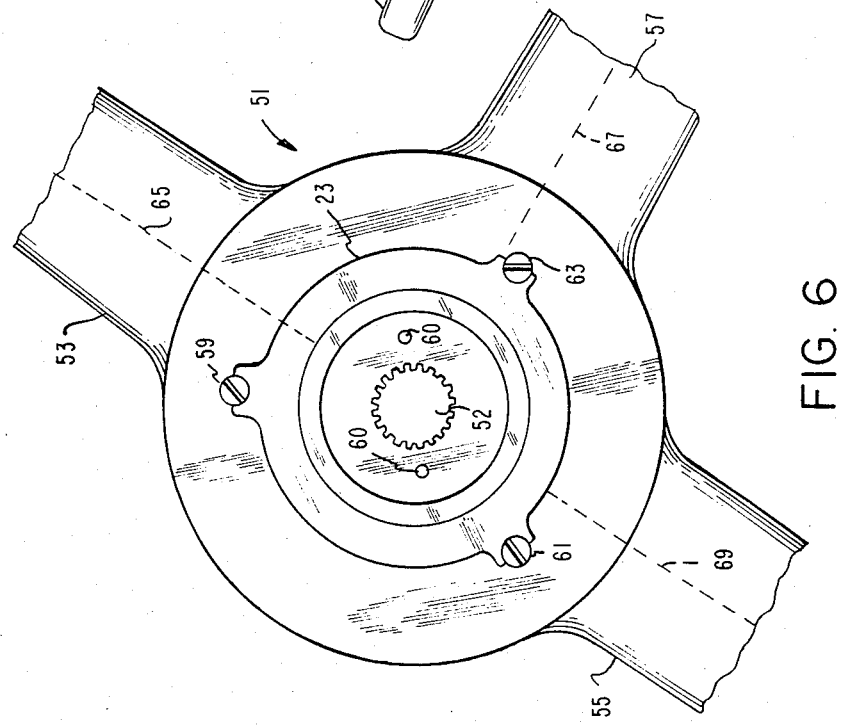
FIG. 6 shows the underside of the steering wheel which has been removed from the vehicle of FIG. 5.

The underside of the steering wheel which has been removed from FIG. 5 is shown in FIG. 6. The wheel has three spokes 53, 55, and 57 and a splined mounting hole 52. The slip ring 23 is concentrically arranged around the hole 52 and is attached to the wheel by means of three screws 59, 61, and 63. The slip ring is insulated from the vehicle's ground. The wires 65, 67, and 69 are each connected to the slip ring and then through each of the steering wheel spokes to the three horn switches near the end of each spoke.

The horn circuit diagram of FIG. 4 shows the car's battery 33 with one side grounded and the other end, normally the positive terminal thereof connected to one side of the coil 35 which may be the horn or horn relay coil. The other terminal of the coil 35 is the horn wire 7 which runs up the steering column to the lower end of rod 5 as shown in FIG. 1 and thence through brush head 25, slip ring 23 and out each steering wheel spoke to three horn switches 37, 39, and 41. When any one of the horn switches is depressed, it grounds the horn wire, as shown, to energize the coil 35 and sound the horn.

Prior to the present invention, if the original brush head becomes worn and inoperative, it was necessary to replace the entire rod 5. As can be seen from FIG. 1, removal of the rod 5 would entail removal of the horn wire terminal 9 and the retaining clip 11, both of which are under the control yoke 3. Thus the control yoke would first have to be removed, the terminal 9 and clip 11 removed, the old rod 5 pulled out and the new rod inserted from the top through the spring 19, the terminal 9 and clip 11 replaced while the control yoke is out, and finally the control yoke and steering wheel are replaced. It can be appreciated that this was a time consuming, expensive and frustrating job for the mechanic and required about 45 minutes of labor plus the cost of the new rod. In contrast, the replacement brush head of the present invention can be quickly and easily installed simply by removing the steering wheel, which is a 2 minute job for a competent mechanic with the proper tools. FIG. 5 shows that once the steering wheel is removed the rod 5 with its worn brush head 25 conveniently projects at least two inches out of the control yoke so that slipping the replacement brush head over the worn head and clipping it in place is a simple job requiring only a minute or two. Further, the cost of the replacement brush head plus the retaining clip is substantially less than that of a new rod.

The replacement brush head 21 of FIG. 7 is a self retaining type which requires no separate retaining means such as the clip 29 of FIGS. 2 and 3. The brush head comprises a metal cylinder with a bore 31 at one end thereof, with the bore arranged to fit over the worn brush head 25 just as the previously described brush head does. The inside of bore 31 has a pair of diametrically opposed projection thereon, 73, and the brush head has a pair of slots 70, each located about 90° away from one of the projections 73. The second slot is not seen in FIG. 7 since it is directly behind the illustrated slot 70. When this replacement brush head is pushed onto a worn brush head, 25, the projections 73 cause the mouth or lower part thereof to spread due to the presence of the slots 70 and the projections then snap under the head of the worn brush head, as illustrated, to hold the replacement brush head on.

While the invention has been illustrated by a replacement brush which is cylindrical, with three pairs of slots therein and a cylindrical bore to accommodate a cylindrical worn brush head, and with the self retaining brush head of FIG. 7, other designs are possible and considered within the scope of the invention. For example, the replacement brush head could have a square cross section or even a square bore to accommodate worn brush heads which are square and the number of pairs of slots can be varied. In fact the slots and the retaining clip and the projections 73 of the brush head of FIG. 7 can be omitted altogether, although this may reduce the reliability of the installation somewhat. Normally the pressure of the spring 19 should be sufficient to press the replacement brush head up against the slip ring and hold all the parts in place. Accordingly the invention should be limited only by the scope of the appended claims.

I claim:

1. A replacement brush head for a worn electrical brush head, said worn electrical brush head comprising an enlarged end of a metal rod which is part of the horn circuit of a vehicle and which rides on a slip ring on the underside of the steering wheel of said vehicle, said metal rod mounted in a bore in an insulated portion of a control yoke beneath said steering wheel, said replacement brush head comprising a hollow metallic cap designed to slip over said worn brush head to restore the proper functioning thereof and eliminate the need for replacing said metal rod and wherein said metallic cap has the external shape of a cylinder and wherein said hollow feature comprises a cylindrical axial bore therein, the depth of said bore being chosen to provide a desired extension in the length of said worn brush head, and wherein said metallic rod is spring-loaded so that it urges said replacement brush head against said slip ring to hold said replacement brush head in place.

2. The replacement brush head of claim 1 wherein said extension in length of said worn brush head is from 5 to 10 millimeters.

3. The replacement brush head of claim 1, further comprising one or more pairs of slots with each slot of a pair of slots at opposite sides of the cylinder walls and with the slots communicating with the bore of the said metal cap, and sping clips are applied to one or more of said pairs of slots to hold said replacement brush head securely on the end of said metal rod to form a new brush head.

4. The replacement brush head of claim 1, further comprising a pair of projections located at diametrically opposed points within said bore, and a pair of slots in the walls of said hollow metallic cap located at diametrically opposed points approximately 90° from each of said projections, said projections being adapted to snap over said worn brush head.

5. A partial automobile horn circuit comprising a horn wire which runs up the steering column of the automobile and is attached to the lower end of a spring loaded metal rod which passes through a plastic portion of a control yoke which is mounted just below the steering wheel of said automobile, the upper end of said spring loaded rod forming an electrical brush head which rides on a slip ring on the underside of said steering wheel, a hollow metal cap designed with a bore therein to accommodate the diameter of said brush head, said hollow metal cap being adapted to be slipped over said electrical brush head which has become worn and inoperative, said hollow metal cap providing a replacement brush head.

6. The partial automobile horn circuit of claim 5 wherein said hollow metal cap comprises a plurality of pairs of slots which communicate with the hollow portion thereof, one or more of said pairs of slots having spring clips inserted therein for securing said metal cap over said worn brush head.

7. A metal cap adapted to fit over and provide a replacement for an electrical brush head which comprises the enlarged end of a metal rod which passes through and is supported by a non-conductive material, the other end of said metal rod having a horn wire connected thereto and wherein said cap comprises a cylinder with an axial cylindrical bore therein, with said bore being just large enough so that said enlarged end of said metal rod may fit snuggly therein, with one or more pairs of slots in said metal cap, said slots communicating with said bore, and wherein a spring clip is inserted in one of said pairs of slots to engage said metal rod just behind said enlarged end thereof.

* * * * *